United States Patent [19]

Sencza

[11] Patent Number: 4,470,907
[45] Date of Patent: Sep. 11, 1984

[54] CONTINUOUS POLYMER FEED SYSTEM FOR A WASTE WATER TREATMENT PLANT

[75] Inventor: Walter Sencza, Manitouwadge, Canada

[73] Assignee: Noranda Mines Limited, Toronto, Canada

[21] Appl. No.: 398,898

[22] Filed: Jul. 16, 1982

[30] Foreign Application Priority Data

Dec. 16, 1981 [CA] Canada ................................. 392395

[51] Int. Cl.³ ............................................. C02F 1/56
[52] U.S. Cl. .................................. 210/192; 210/199; 210/206
[58] Field of Search ............... 210/702, 709, 716, 725, 210/727-729, 732, 734, 738, 778, 101, 105, 139, 140, 198.1, 199, 206, 192, 918

[56] References Cited

U.S. PATENT DOCUMENTS

| | | |
|---|---|---|
| 2,378,323 | 6/1945 | Pomeroy .............................. 210/716 |
| 3,087,890 | 4/1963 | Pye ...................................... 210/716 |
| 3,399,133 | 8/1968 | Gerdes et al. ....................... 210/709 |
| 3,523,889 | 8/1970 | Eis ........................................ 210/207 |
| 3,666,663 | 5/1972 | Walker ................................ 210/738 |
| 3,933,642 | 1/1976 | Wilson ................................ 210/206 |

FOREIGN PATENT DOCUMENTS

| | | |
|---|---|---|
| 56117 | 7/1982 | European Pat. Off. ............ 210/729 |
| 2457360 | 6/1975 | Fed. Rep. of Germany ... 210/198.1 |
| 50-18874 | 7/1975 | Japan ................................ 210/198.1 |

*Primary Examiner*—Peter A. Hruskoci
*Attorney, Agent, or Firm*—Fleit, Jacobson, Cohn & Price

[57] ABSTRACT

A continuous polyelectrolyte feed system is disclosed. The system comprises means for providing a metered stream of dilution water, means for adding metered quantity of polyelectrolyte to the dilution water stream, means for flash mixing the polyelectrolyte in the dilution water stream, a plug flow reactor for aging the polyelectrolyte solution so as to allow the polyelectrolyte sufficient time to become active, and means for flash diluting the polyelectrolyte before injection into the waste water.

3 Claims, 6 Drawing Figures

CONTINUOUS POLYMER FEED SYSTEM FOR A WASTE WATER TREATMENT PLANT

This invention relates to the removal of suspended matter from waste water and more particularly to a system for continuously feeding polyelectrolytes to a waste water treatment plant.

One of the greatest advances in solid-liquid separation has been the development of polymers with remarkable abilities to flocculate solids when added in only trace quantities. Indeed, these polyelectrolytes may be used to replace the previously used primary coagulants, such as alums. Although they are considerably more expensive than primary coagulants, the dose rate is much lower. Already widely used in the mining industries, polyelectrolytes are now being considered for solid-liquid treatment applied to sewage.

The types of synthetic polymer which are considered useful fall into three main classes, namely nonionic, anionic and cationic. Examples of nonionic polymers are the polyacrylamides and the polyethyleneoxides. Examples of anionic polymers are the acrylamide copolymers and the polyacrylics. Examples of cationic polymers are the polyamines and some acrylamide copolymers. The mechanism of flocculation by polyelectrolytes is considered to involve the two processes of surface neutralization and bridging, as commonly known. If the first mechanism is to be effective, then one must make sure to choose a polyelectrolyte whose charge is of the opposite sign to the charge of the particles to be removed from the waste water. The charge density on the polymer is an important measure of its capacity to flocculate. The correct choice of polyelectrolyte is best made after laboratory trials on samples of the liquid to be clarified. It will always be necessary to determine the optimum dosage for the best results, especially where an expensive chemical is in use.

Efficient use of the expensive agent is assured if a proper dosing system is adopted. The polymers are supplied either as solids or liquids and obviously for efficient dosing at low levels, the polyelectrolytes must be taken up into some liquid. One known polymer feed system incorporated a wetting drum and eductor to complete batch mixing of dry polymers. The polymer addition to the waste water treatment plant was completed by high-volume metering pumps and in-line mixers. For liquid polymers, a centrifugal pump was used to add concentrated polymers to a mixing tank. The liquid polymers were still mixed on a batch basis. As with the dry polymers, metering pumps and an in-line mixer were used to complete addition to the waste water treatment process.

The above batch system required daily cleaning by an operator to assure efficient use of the polyelectrolyte. In addition, breakdown of the equipment was often encountered due to the complexity of the feed system.

It is therefore the object of the present invention to provide a system for continuous (as opposed to batch) addition of polyelectrolytes to a waste water treatment plant.

The system, in accordance with the invention, comprises means for providing a metered stream of dilution water, means for adding a metered quantity of polyelectrolyte to the dilution water stream, means for flash mixing the polyelectrolyte in the dilution water stream, a plug flow reactor for aging the polyelectrolyte solution so as to allow the polyelectrolyte sufficient time to become active, and means for flash diluting the polyelectrolyte before injection into the waste water.

Polyelectrolyte activators and other additives are often added to the water stream before injection of the polyelectrolyte in order to condition the water used to dilute the polyelectrolyte.

The invention will now be disclosed, by way of example with reference to the accompanying drawings in which.

Figure 1:
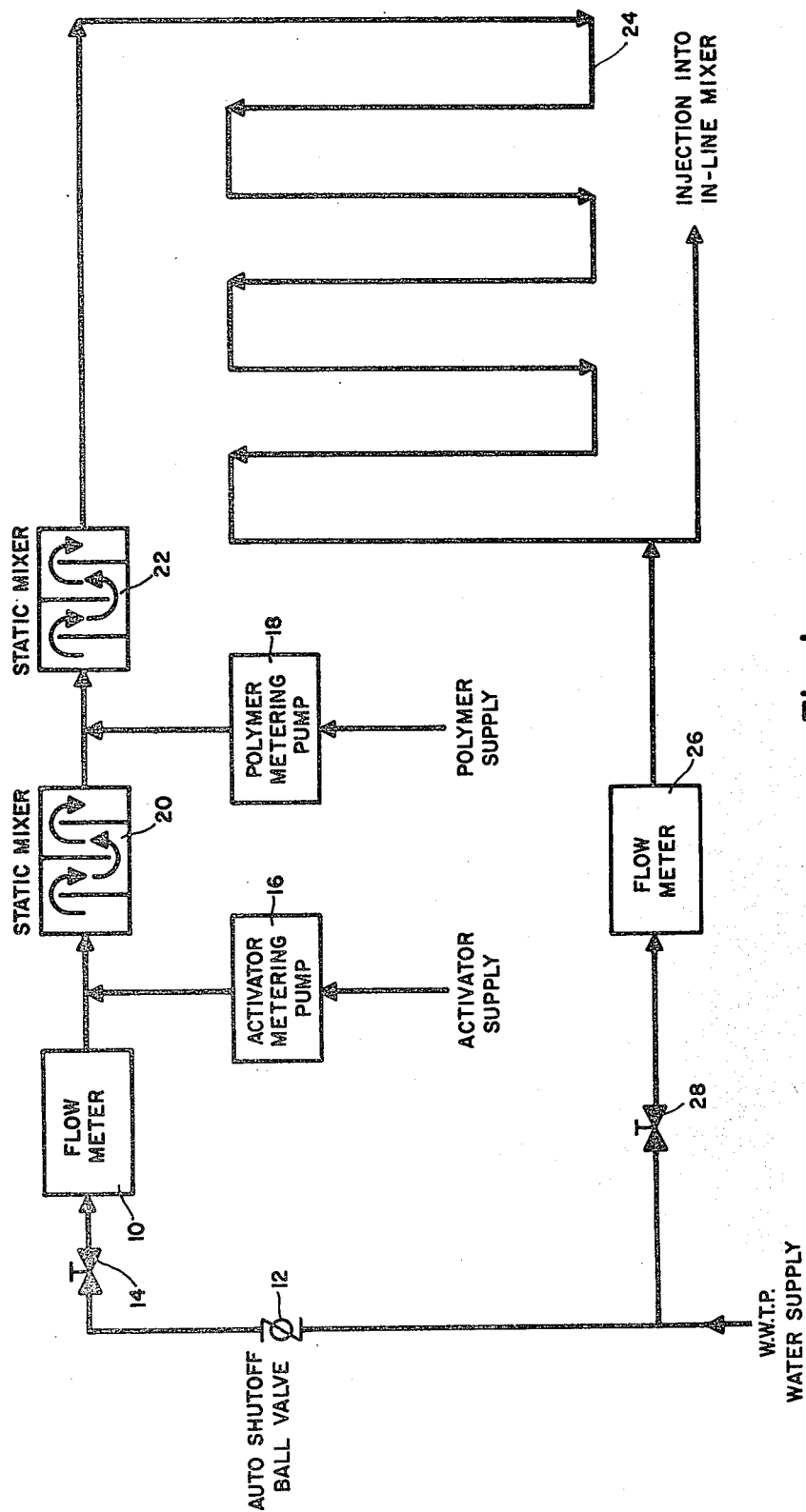
FIG. 1 illustrates a diagram of a continuous polymer feed system in accordance with the invention.

Referring to FIG. 1 of the drawings, a continuous flow of dilution water (from a waste water treatment plant (WWTP) water supply) is fed into a pipe line of suitable diameter. The water supply flow rate is controlled by a flow meter 10 in order to maintain the flow at a set point regardless of the upstream or downstream pressure. An automatic shut-off valve 12 and a manual valve 14 may also be provided in the dilution water stream. A suitable polymer activator is added to the water stream by means of a metering pump 16. The activator is a water conditioner and may not be required. Its use depends on the condition of the water supply. A full strength polymer is added to the water stream by means of a second metering pump 18. The pumps are preferably positive displacement Liquid Metronics Metering pumps, such as model LMI-B52 (which can be controlled by a suitable frequency input signal), although other types of metering pumps could be used. Static mixers 20 and 22 are used to mix the activator and the polymer with the water stream after injection. The combined mixture is conducted through a plug flow reactor 24, which is preferably a long length of coiled plastic pipe. Dilution water is added to the output of the plug flow reactor through a flow meter 26 and a manual valve 28 and the diluted mixture is piped to an in-line mixer (not shown) for addition to the waste water.

As it is seen from the description of the above system, there are four basic steps involved in preparing a diluted polymer solution for use in the waste water treatment plant. First, an activator is injected into the polymer dilution water. The type of activator used depends on the nature of the water supply and may not be required. Secondly, the concentrated polymer is injected and flash mixed before it has an opportunity to "uncurl" and become active. Thirdly, the polymer is given sufficient residence time in the plug flow reactor to allow the polymer to "uncurl" and become active. Fourthly, just prior to injection into the waste water the "aged" polymer solution is flash diluted to aid in the distribution of the polymer at the injection point.

In a preferred embodiment of the invention, positive displacement metering pumps are used. These metering pumps generate a pulsating type flow of activator and polymer and the construction of the static mixers was greatly simplified by inserting nipples of smaller diameter in a coiled length of plastic tubing. Turbulent eddy currents at the discharge end of the nipples provided sufficient mixing with three nipples to ensure a homogeneous solution.

The plug flow reactor is preferably a coil of plastic pipe which is long enough to provide adequate aging of the polymer as it flows through the pipe. The curvature of the coil induces a secondary flow pattern which is perpendicular to the axis of the pipe, as commonly known, and thus provides a gentle mixing action which insures a complete mixing of the polymer solution without any danger of breaking the flocculant chains. The residence time in the plug flow reactor may be varied by modifying the dilution flow rate or by adding or deleting lengths of plastic pipe.

The primary advantage of the continuous polymer feed system is its simplicity and consequently low cost. Because of the wide range ability of the metering pumps (20:1 to 200:1), polymer dosage levels to the process can be altered dramatically. This overdosing capability is an advantage during upset periods at the waste water treatment plant. Polymer consumption has been reduced from levels of 15–22 mg/l of polymer when using batch mixing to 2–3 mg/l with the continuous feed system. This represents a great saving of the expensive polymer. Furthermore, the system operates without operator attention and the only potential for failure of polymer feed is the loss of dilution water or the failure of either of the metering pumps.

Tests were performed to determine (1) the effects of activator additions on the polymer and (2) the mixing and/or aging time required for activation of the polymer. The results of these tests are illustrated in the following examples:

EXAMPLE I

The polyelectrolyte used was Alchem 87079, a medium weight, medium charge anionic type polyacrylamide polymer supplied by Alchem Inc., Burlington, Ontario. The activator was a water softener also supplied by Alchem Inc.

The method used to determine the effects of various Alchem activator dosages on the settling characteristics of the Alchem 87079 polymer was as follows:

1. A 5 gallon sample of treatment plant influent water was neutralized with dry hydrated lime additions to a pH of 9.5. The contents were stirred for 30 minutes and lime was added as required to maintain a 9.5 pH.

2. A 1.0% stock solution of Alchem activator was prepared by adding 10 ml of concentrated activator to 1000 ml of treatment plant supply water. The activator was distributed by vigorously stirring with a spatula for about 30 seconds.

3. The following steps were repeated for each of the six tests:
 (a) For
Test #1; 1 ml of stock activator
Test #2; 3 ml of stock activator
Test #3; 5 ml of stock activator
Test #4; 10 ml of stock activator
Test #5; 20 ml of stock activator
Test #6; 30 ml of stock activator
was added to 1000 ml of treatment plant supply water and stirred vigorously for about 30 seconds.
 (b) 1.0 ml of concentrated 87079 was added to the diluted activator solution in step (a) and the contents gently stirred with a mixer for 20 minutes.
 (c) 1000 ml of the neutralized solution (obtained in Step 1) was poured into a 1000 ml (settling test) graduated cylinder.
 (d) After the 20 minutes mixing time, 7.0 ml of the polymer-activator in step (b) was injected into the graduated cylinder in step (c) and the cylinder was gently inverted 10 times to distribute the polymer.
 (e) The cylinder contents were then allowed to settle and the sludge volume was recorded at 1 minute intervals for 15 minutes.

Figure 2:
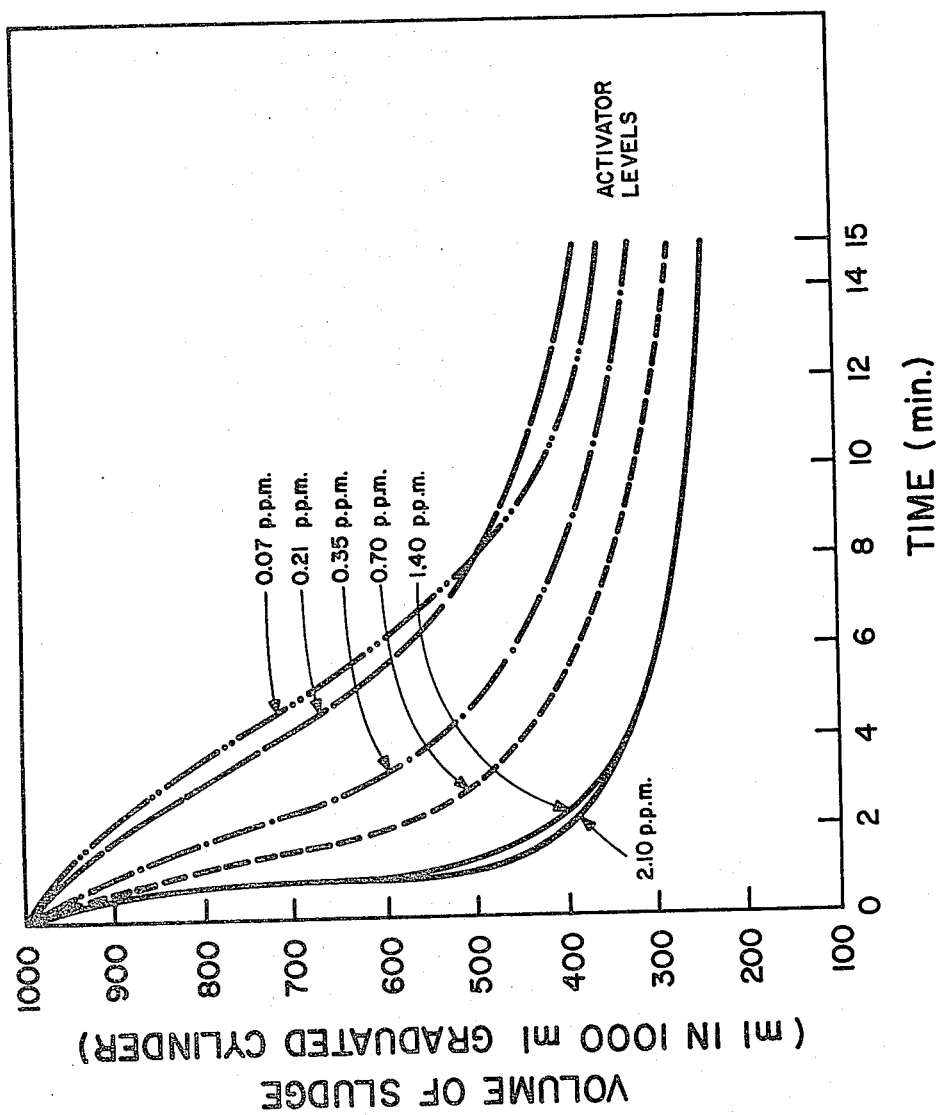
FIG. 2 illustrates the effect of activator dosage on the settling rate of a particular polymer.

FIG. 2 illustrates the effect of activator dosages from 0.07 ppm to 2.1 ppm on Alchem 87079 settling rates at a constant polymer dosage of 7 ppm. Significant increases in settling rates occurred up to a dosage level of 1.40 ppm which represents 20% of the polymer dosage level. The floc size became increasingly coarser as the activator dosage increased. However, addition of activator at greater than 20% of polymer addition rate resulted in a frothing problem at the treatment plant. An activator dosage level of between 10% and 20% of the polymer dosage level resulted in the highest settling rate of suspended solids for the particular type of water being treated. Of course, the activator dosage depends on the type of water at the waste water treatment plant, and would be different for other types of water. The activator may not even be required at all with "normal" water supplies.

EXAMPLE II

Tests were also made to determine the mixing and/or aging time required to activate the Alchem polymer 87079. The method used was as follows:

1. Dilution water for the polymer was prepared by taking 10 liters of treatment plant supply water, adding 1 ml of Alchem activator and mixing for 2 minutes. (This represented a 0.01% activator solution).

2. A 3 gallon sample of the treatment plant influent was neutralized with hydrated lime to a pH of 9.0 and the sample was then aerated for 30 minutes in order to oxidize the ferrous hydroxide to ferric hydroxide. Lime was added as required to maintain a pH of 9.0.

3. The following steps were repeated for each of the seven tests:
 (a) 1000 ml of neutralized influent water was placed into a 1000 ml graduated cylinder.
 (b) 1 ml of concentrated 87079 was added to 1000 ml of dilution water (Step #1) and mixed for:
Test #1—30 minutes
Test #2—10 seconds
Test #3—1.0 minutes
Test #4—2.0 minutes
Test #5—6.0 minutes
Test #6—10.0 minutes
Test #7—15.0 minutes
 (c) Immediately after the mixing time period 10 ml of the diluted polymer solution (in step b) was added to the solution in the graduated cylinder (in step a).
 (d) The graduated cylinder was then gently inverted 10 times to distribute the polymer.
 (e) The contents of the graduated cylinder were then allowed to settle for 15 minutes.
 (f) The clarity, floc size and final sludge volume were recorded for each test.

In each test the final sludge volume was 170 ml and the coarse floc settled very quickly. In Test #2 through Test #5, the supernatant was opaque (white coloration with some very fine suspended material). Test #6 showed a clearing trend in the super natant and, in Test #7, the super natant was similar in clarity to Test #1 (which was the control). Each settling test represented a 10 ppm polymer dosage and a 1 ppm activator dosage level.

Alchem 87079 required a mixing and/or aging time of about 15 minutes for a 0.1% polymer solution. From these results, it was concluded that the residence time of the polymer in the feed system should be approximately 15 minutes.

EXAMPLE III

Various tests were made to study the dependence of floc settling rates(and supernatant clarity of neutralized treatment plant influent) with respect to the aging time of a flash mixed activator/polymer solution.

The method used was as follows:

1. Two and half gallons of Waste Water Treatment Plant influent water was neutralized by additions of hydrated lime to a pH between 9.0 and 10.0. After 30 minutes of mixing time the final pH was recorded.

2. (a) Series 1 Tests (i) A stock solution of activator/polymer was prepared by taking 1 ml of Alchem activator and injecting it into 2 liters of W.W.T.P. dilution water. The solution was stirred vigorously for 2 minutes after which 10 ml of concentrated Alchem 87079 polymer was injected and the solution vigorously stirred for 5 seconds.

(ii) The lab mixer was then removed and the stock solution was allowed to age without any additional mixing.

(iii) After:
 15 minutes of aging time (for test number 1)
 20 minutes of aging time (for test number 2)
 30 minutes of aging time (for test number 3)
 60 minutes of aging time (for test number 4)
a 2 ml sample of the aged activator/polymer stock solution was withdrawn and added to a 1000 ml graduated cylinder filled with neutralized influent water (from step 1).

(iv) The 1000 ml graduated cylinder was then gently inverted 10 times to distribute the injected stock solution.

(v) The contents of the graduated cylinder were then allowed to settle for 15 minutes with the sludge volume recorded at 1 minute intervals. (The clarity of the supernatant was also recorded).

Figure 3:
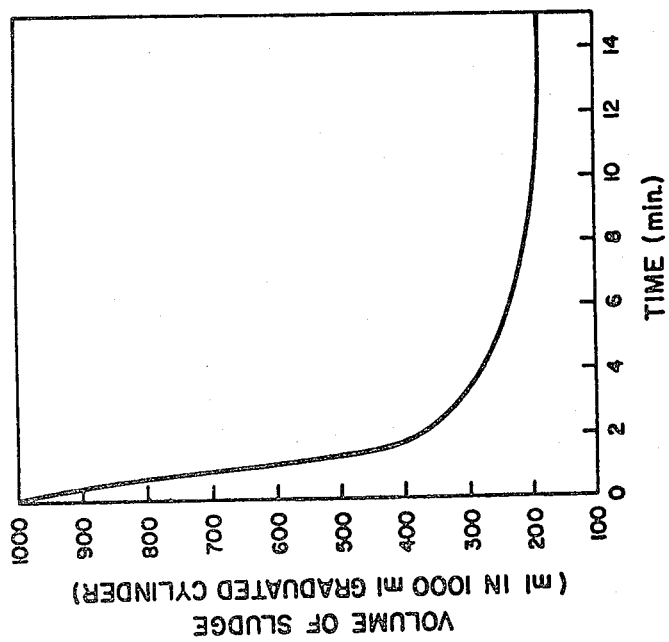

(vi) Steps (iii) to (v) were repeated for each of the 4 tests. The settling curves for aging times of 15, 20, 30, and 60 minutes are shown in FIG. 3 and were all identical and are represented by a single curve.

2. (b) Series 2 Tests (i) A stock solution of activator/polymer was prepared by taking 1 ml of Alchem activator and injecting it into 2 liters of W.W.T.P. dilution water with the solution being vigorously mixed. Five seconds after the activator injection, 10 ml of concentrated Alchem 87079 was injected and the solution vigorously stirred for another 5 seconds after which the mixer was stopped.

(ii) The lab mixer was then removed and the stock solution was allowed to age without any additional mixing.

(iii) After:
 9 minutes of aging time (for test number 5)
 10 minutes of aging time (for test number 6)
 12 minutes of aging time (for test number 7)
 15 minutes of aging time (for test number 8)
a 2 ml sample of the aged activator/polymer stock solution was withdrawn and added to a 1000 ml graduated cylinder filled with neutralized influent water (from step 1).

(iv) The 1000 ml graduated cylinder was then gently inverted 10 times to distribute the injected stock solution.

(v) The contents of the graduated cylinder were then allowed to settle for 15 minutes with the sludge volume recorded at 1 minute intervals. (The clarity of the supernatant was also recorded along with solution temperatures).

Figure 4:
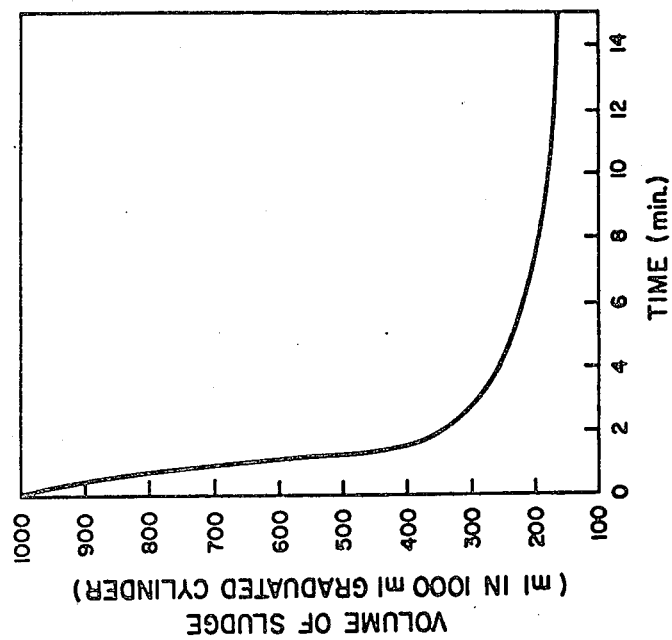
FIGS. 3, 4 and 5 illustrate the settling curves after various aging times of the polymer prior to injection into the waste water.

(vi) Steps (iii) to (v) were repeated for each of the 4 steps. The settling curves for aging times of 9, 10, 12 and 15 minutes are shown in FIG. 4 and were all within ±15 ml. They are represented by a single curve.

2. (c) Series 3 Tests

For this series of tests the 2000 ml of treatment plant dilution water for the activator/polymer solution was cooled down to 6° C.

The steps outlined for series 2 test were used for this series except that only two tests were performed with aging times of 5 minutes and 10 minutes.

Figure 5:
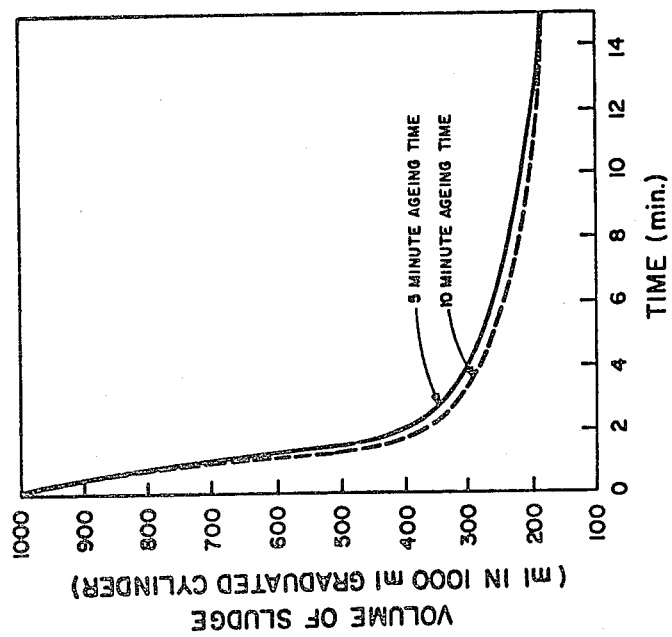

The final pH of the neutralized influent water was 9.9. In all of the tests performed, the supernatant was clear with equal amounts of suspended matter in the supernatant for each test. The temperature of the activator/polymer solution in Series 2 was 17° C. and the neutralized influent water temperature in the 1000 ml graduated cylinders was also 17° C. in each test of Series 2. In Series 3 the temperature of the stock solution and the two 1000 ml graduated cylinder samples of neutralized influent water were all 6° C. The settling curves for series 3 are illustrated in FIG. 5.

Comparison between Series 1 and Series 2 indicated that a 5 second flash mix of activator prior to the addition of Alchem 87079 polymer was sufficient for distributing the activator into solution. Aging of the flash mixed stock solution and polymer did not show any significant differences in settling rates over the range of 9 minutes to 60 minutes of aging time.

The settling curve in the Series 3 test for a 10 minute aging time was about the same as in the Series 2 test for a 10 minute aging time and thus temperature dependence on the settling rate results was not found to be significant over the range of 6° C. to 17° C.

The settling curve in Series 3 test for a 5 minute aging time showed a slightly lower settling rate but not significantly lower. The differences could well have been caused by initial turbulence in the graduated cyl- inder.

The results of the above lab tests indicate that a continuous polymer feed system including flash mixing of the polymer (and the activator if any) followed by a "safe" residence time for aging in a plug flow reactor, such as a long length of plastic pipe, is possible.

Any polyelectrolyte may be used in the continuous feed system provided that its viscosity is low enough to ensure its distribution into the solution. The feasibility of using the above disclosed continuous polymer system was demonstrated using Alchem 87079. In order to size the system, the following calculations and design criteria were used:

| | |
|---|---|
| Maximum Polymer Consumption = | 40 ml/min. |
| Maximum Activator Consumption = | 4 ml/min. |
| Average Polymer Consumption = | 20 ml/min. |
| Average Activator Consumption = | 2 ml/min. |
| Maximum Dilution Water Requirements for 0.5% | |
| Polymer Strength = | 1.75 Imp. g.p.m. |
| = | 2.1 US g.p.m. |

| Average Polymer Concentration Using Max. | |
|---|---|
| Dilution Water = | 0.25% |

Assuming the dilution water would be left at a fixed flow rate of 1.75 Imp. g.p.m. then the residence time within a length of plastic pipe would remain constant and the concentration of polymer/activator would vary according to the feed rates of the LMI metering pumps.

The following data on viscosity of Alchem 87079 polymer solutions was obtained from Alchem Inc.;

TABLE I

Alchem 87079 Solution Viscosities at 25° C.

| Polymer Concentration (% by weight) | Viscosity (centipoise) | Mean Viscosity (Centipoise) |
|---|---|---|
| 1.0 | 300–450 | 375 |
| 1.5 | 750–1050 | 900 |
| 2.0 | 1300–2000 | 1650 |
| 2.5 | 2200–2900 | 2550 |
| 3.0 | 3200–4100 | 3650 |

Applying a power curve least squares regression analysis to the mean viscosity with respect to polymer concentration resulted in the following equation:

$$Y = 0.85 + 382.3 x^{2.073}$$

Where, $Y$ = mean viscosity at 25° C. in centipoise
$x$ = % solution strength of Polymer by weight The correlation co-efficient ($r^2$) was 0.99947 indicating a very close fit of data to the equation. Since the power curve was such a close fit, the following extrapolated values for viscosity at 25° C. were assumed reasonable:

TABLE 2

Extrapolated Alchem 87079 Solution Viscosities at 25° C.

| Polymer Concentration (% by weight) | Viscosity (Centipoise, u) |
|---|---|
| 0.50 | 92 |
| 0.40 | 58 |
| 0.30 | 32 |
| 0.20 | 14 |
| 0.10 | 4 |
| 0.05 | 2 |
| 0.01 | 1 |
| 0 (Water) | 0.85 (at 25° C.) |

Assuming that the dilution water flow rate is maintained at Q=2.1 US g.p.m. in a half inch pipe and the inside pipe diameter of the static mixer 22 is d=0.622 inches and that the density of the flowing solution is p=62.22 lb/ft³ at 25° C., then the following table illustrates the Reynolds number ($N_{Re}$) for unobstructed flow in the half inch pipe with respect to polymer concentration (or with respect to solution viscosity).

TABLE 3

Estimated Reynolds Numbers at Various Polymer Feed Rates

| Dosage Level into Process* (mg/l) | Concentrated Alchem 87079 Feed Rate (ml/min.) | Alchem 87079 Solut. Streng. (% by Weight) | Estimated Reynolds Number ($N_{Re}$) | $N_{Re} = 50.60 \frac{Qp}{du}$ |
|---|---|---|---|---|
| 17.6 | 40 | 0.5 | 115 | Q = 2.1 US g.p.m. |
| 14.1 | 32 | 0.4 | 183 | p = 62.22 lb/ft³ |
| 10.6 | 24 | 0.3 | 332 | d = 0.622 inches |
| 7.0 | 16 | 0.2 | 759 | u = (see table 2) |
| 3.5 | 8 | 0.1 | 2,657 | |
| 1.2 | 4 | 0.05 | 5,314 | |
| 0.4 | 1 | 0.01 | 10,629 | |
| 0 | 0 | 0 | 11,810 | |

*Assuming Process Flow of 500 g.p.m.

Table 3 indicates that laminar flow in an unobstructed half inch pipe will occur at polymer feed rates at 16 ml/min or higher. Thus static mixers are required to ensure turbulent flow (i.e. flash-mixing) to distribute the polymer into solutution.

Table 4 represents the same data as in Table 3 but the inside pipe diameter represents a 1.5 inch plastic pipe inside diameter (plug flow reactor).

TABLE 4

Estimated Reynolds Numbers at Various Polymer Feed Rates

| Dosage Level Into Process* (mg/l.) | Concentrated Alchem 87079 Feed Rate (ml/min.) | Alchem 87079 Solution Strength (% by weight) | Estimated Reynolds Number ($N_{Re}$) | $N_{Re} = 50.60 \frac{Qp}{du}$ |
|---|---|---|---|---|
| 17.6 | 40 | 0.5 | 45 | Q = 2.1 US g.p.m. |
| 14.1 | 32 | 0.4 | 71 | P = 62.22 lb/ft³ |
| 10.6 | 24 | 0.3 | 128 | d = 1.610 inches |
| 7.0 | 16 | 0.2 | 293 | u = (see Table 2) |
| 3.5 | 8 | 0.1 | 1926 | |
| 1.2 | 4 | 0.05 | 2053 | |
| 0.4 | 1 | 0.01 | 4106 | |
| 0 | 0 | 0 | 4831 | |

*Assuming Process Flow of 500 g.p.m.

For Carlon TM plastic pipes the relative roughness of the wall is about $3.7 \times 10^{-5}$. From the Moody Friction factor plot the last two entries in Table 4 are just into the transition flow regime. Since the expected polymer dosage levels will not drop below 3.5 mg/1 (or equivalent 8 ml/min feed rate of concentrated 87079) then it can be assumed that flow in the 1.5″ Carlon plastic pipe will be laminar for all expected purposes (because of the use of coiled Carlon some gentle mixing will occur). Since the flow will be laminar in the Carlon pipe, shearing of the flocculant would be minimized.

The maximum and minimum expected friction factors for the Carlon plastic pipe would be 1.42 and 0.03 respectively (for 40 ml/min. and 4 ml/min. of polymer feed rate).

Using one 250 ft coil of 1.5 inch Carlon plastic pipe for aging purposes represents a residence time of 13 min. at a flow rate of 1.75 Imp. g.p.m. Assuming a coil radius of 6 feet, the number of 90° bends (or quarter circles) is 53. The equivalent length of the coiled pipe can be expressed as follows (in pipe diameters):

$$L/D_t = (53-1)(34+9) + 56 = 2,292$$

Thus the pressure drop due to frictional losses through the coil of Carlon for the worst case of maximum polymer feed rate is:

$$\Delta P = .00001799 f \left( \frac{L}{D} \right) p \frac{Q^2}{d^4} = 2.39 \text{ psi}$$

This pressure drop is insignificant since the normal treatment plant water supply pressure is roughly 90 p.s.i. A higher amount of pressure drop can be expected across the in-line static mixers. Estimates of this pressure loss cannot be calculated but tests on the system with pressure gauges could be utilized to determine the pressure loss across the static mixers at a flow rate of 1.75 Imp. g.p.m.

In the calculations performed Newtonian flow was assumed and all parameters were based on a fluid temperature of 25° C. With colder temperatures, the viscosity of the solutions will increase and the Reynolds number will decrease. Flow will still be laminar in the Carlon pipe and would not cause any polymer shearing problems. Increases in the Friction Factor of up to 10 times higher could be easily handled (i.e. 23.9 p.s.i. pressure drop across the Carlon coil). Thus colder solution temperatures with resultant increased viscosities should not present any problems.

The polymer metering pump would be required to supply at least 32 ml/min. of concentrated Alchem 87079.

A continuous polymer system similar to the one proposed above was built at the Geco Division of Noranda Mines Limited in Manitouwadge except that the plug flow reactor was a 340 foot coil of nominal 1 inch plastic Carlon pipe. The coil of Carlon represented a total volume of 2.041 ft³ or 12.711 Imperial gallons. To determine the flow rate through the system, a Hedland "Oil" flow meter was utilized. The flow rate of dilution water (in Imperial gallons/minute) through the system was determined by taking three quarters of the Hedland meter reading.

The optimum flow rate for flash mixing purposes was found to be around 0.75 Imp. g.p.m. This represented a residence time in the Carlon coil of 17 minutes. Table 5 illustrates the relationship between the dilution water flow rate and the resultant concentration of the polymer solution at various concentrated polymer feed rates. Note that the dilution water flow rate would normally be fixed at 0.75 Imp. g.p.m. and that the concentration of the polymer solution would vary. In extreme situations the flow rate of dilution water could be altered to provide satisfactory polymer solution concentrations. Levels of activator were adjusted to provide approximately 15% of the flow rate of concentrated polymer.

TABLE 5

Concentration of Polymer Solution in Continuous Polymer System

| Dilution Water Flow (1GPM) | Residence Time (Min.) | Polymer Feed Rate (ml/min.) | | | | | |
|---|---|---|---|---|---|---|---|
| | | 5 | 10 | 20 | 30 | 40 | 50 |
| 2.25 | 5.7 | .05 | .10 | .20 | .30 | .40 | .50 |
| 2.00 | 6.4 | .05 | .11 | .22 | .33 | .44 | .55 |
| 1.75 | 7.3 | .06 | .13 | .26 | .39 | .52 | .65 |
| 1.50 | 8.5 | .07 | .15 | .30 | .45 | .60 | .75 |
| 1.25 | 10.2 | .09 | .18 | .36 | .54 | .72 | .90 |
| 1.00 | 12.7 | .11 | .22 | .44 | .66 | .88 | 1.10 |
| .75 | 17.0 | .15 | .30 | .60 | .90 | 1.20 | 1.50 |
| .50 | 25.4 | .22 | .44 | .88 | 1.32 | 1.76 | 2.20 |
| .25 | 50.8 | .44 | .88 | 1.76 | 2.64 | 3.52 | 4.40 |

Figure 6:
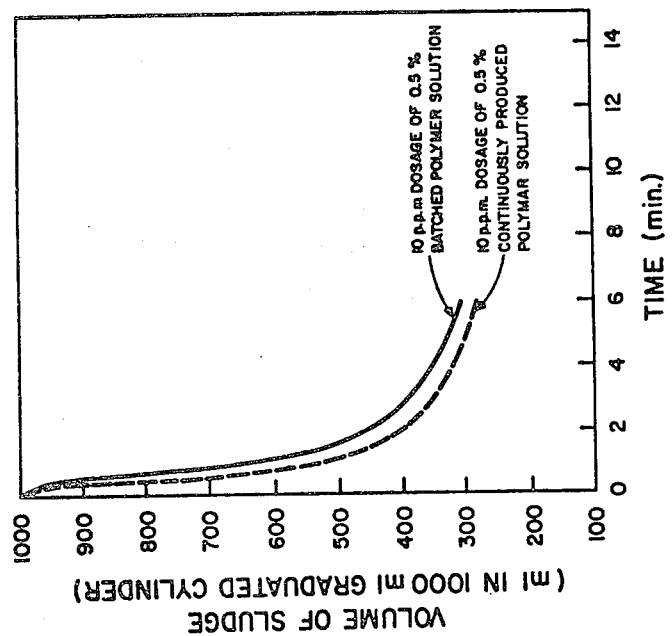
FIG. 6 illustrates comparative results indicating settling rates obtained using a batch produced polymer solution and the solution produced by the continuous polymer feed system in accordance with the invention.

A comparison settling test was performed using continuous and batch produced polymer. Both solutions represented a 0.5% solution of polymer (Alchem 87079). For each test 2 ml of the polymer solution was injected into a 1000 ml graduated cylinder filled with neutralized raw water (taken from the aeration tank at the treatment plant). The cylinder was gently inverted 10 times and the volume of sludge with respect to time was recorded. The results (plotted in FIG. 6) did not indicate any substantial differences in settling rate or clarity. In fact, the continuously produced polymer solution yielded a slightly higher settling rate.

The loss of concentrated polymer flow could be detected by placing a light source-detector system across a clear plastic tubing down stream of the polymer injection point. Normally, the solution is opaque and the light source would not be able to penetrate across the width of the tubing to the detector. On loss of polymer flow, the solution in the tubing turns clear and an alarm and/or shut down would be triggered because the light source would penetrate through the clear water to the detector.

This alarm would not work however, if the polymer solution flow line became blocked downstream. In order to detect a blockage in the flow line, a high pressure sensor (with contacts) could be installed near the Hedland flow meter. Normally, pressures there are less than 30 psig. In the event of a blockage, the pressure would rise to the water supply pressure level (90 psig), thus actuating an alarm and/or shut-down. This would cover almost all possible losses of polymer flow to the process except a physical break in the Carlon coil or the piping to the process injection point.

I claim:

1. A continuous polyelectrolyte feed system for a waste water treatment plant comprising means for providing a metered stream of dilution water, means for continuously adding a metered quantity of liquid polyelectrolyte to the dilution water stream, means for continuously flash mixing the polyelectrolyte in the dilution water stream to provide a homogeneous solution of the polyelectrolyte in the dilution water stream, means for continuously flowing the stream of polyelectrolyte solution through a plug flow reactor for aging the polyelectrolyte solution so as to allow the polyelectrolyte sufficient time to become active, said plug flow reactor being a coil of plastic pipe which is long enough to provide adequate aging of the polyelectrolyte as it flows through the pipe means for continuously flash diluting the aged polyelectrolyte before injection into the waste water and means for adding the diluted aged polyelectrolyte into an in-line mixer of said waste water treatment plant.

2. A continuous polyelectrolyte feed system as defined in claim 1, wherein means are provided for continuously injecting a polyelectrolyte activator into the water stream before injection of the polyelectrolyte.

3. A continuous polyelectrolyte feed system as defined in claim 1 or 2, wherein the means for adding a metered quantity of activator or polyelectrolyte is a metering pump of the pulsating type and wherein the means for flash mixing the activator or polyelectrolyte is a coil of plastic tubing having nipples of smaller diameter inserted therein.

* * * * *